S. H. ALEXANDER.
LIGHTING DEVICE FOR GAS STOVES.
APPLICATION FILED JUNE 6, 1916.

1,245,548.

Patented Nov. 6, 1917.
2 SHEETS—SHEET 1.

S. H. ALEXANDER.
LIGHTING DEVICE FOR GAS STOVES.
APPLICATION FILED JUNE 6, 1916.
1,245,548.
Patented Nov. 6, 1917.
2 SHEETS—SHEET 2.
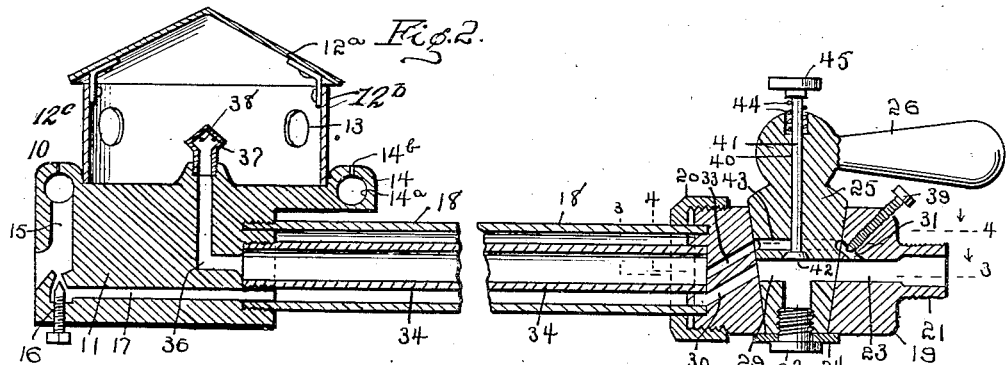
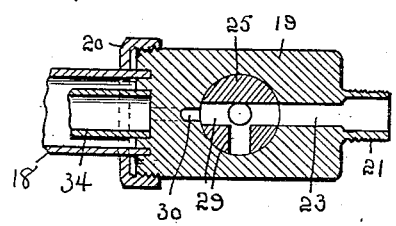
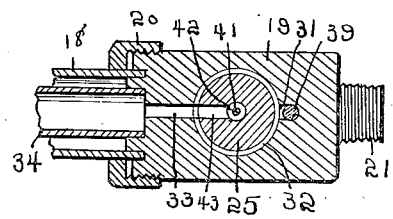
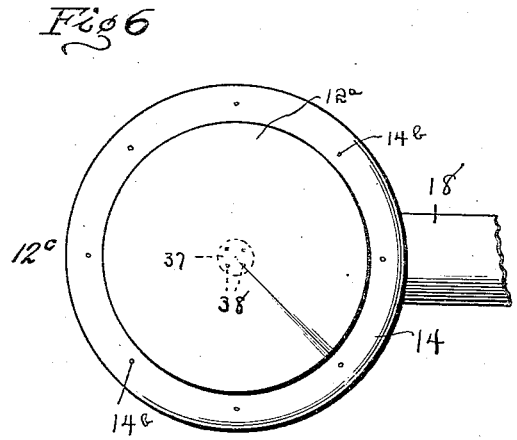
Inventor
S. H. Alexander.

UNITED STATES PATENT OFFICE.

SIDNEY H. ALEXANDER, OF ENGLEWOOD, NEW JERSEY.

LIGHTING DEVICE FOR GAS-STOVES.

1,245,548.  Specification of Letters Patent.  Patented Nov. 6, 1917.

Application filed June 6, 1916. Serial No. 101,951.

*To all whom it may concern:*

Be it known that I, SIDNEY H. ALEXANDER, a citizen of the United States, residing at Englewood, in the county of Bergen and State of New Jersey, have invented certain new and useful Improvements in Lighting Devices for Gas-Stoves; and I do hereby declare the following to be a full, clear, and exact description of the invention, such as will enable others skilled in the art to which it appertains to make and use the same.

This invention relates to improvements in lighting devices for gas stoves, and has for its primary object to provide a lighting device associated with and operable independently of the simmering burner an improved type of valve for controlling the simmering burner and the lighting device.

Figure 1:
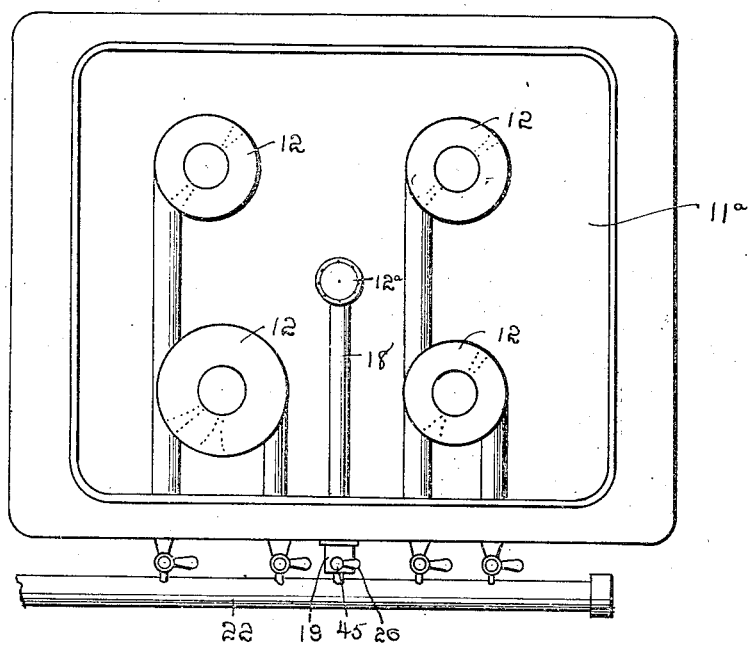
Figure 5:
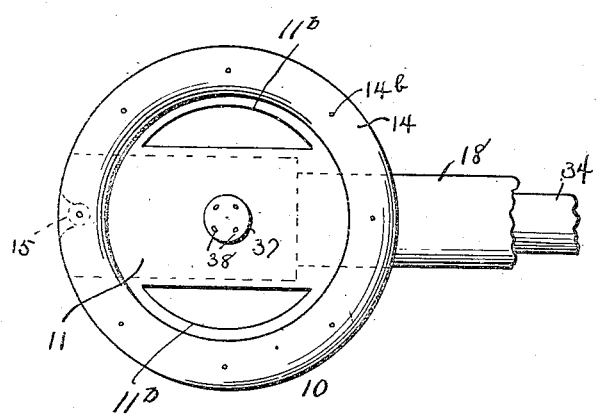

With this and other objects in view, the invention consists in the novel construction, combination and arrangement of parts as will be hereinafter specifically described, claimed and illustrated in the accompanying drawings, in which:

Figure 1 represents a plan view of a gas stove illustrating the invention applied to use, Fig. 2 represents a longitudinal sectional view through the lighter, partly broken away, Fig. 3 represents a horizontal sectional view on the line 3—3 of Fig. 2, Fig. 4 represents a horizontal sectional view on the line 4—4 of Fig. 2, Fig. 5 represents a plan view of the lighter, the cap being removed, and Fig. 6 represents a fragmentary plan view of the lighter.

Referring to the drawings in detail, wherein similar reference numerals designate corresponding parts throughout the several views, the numeral 10 indicates generally the simmering burner forming part of the invention which is supported upon the top of a gas stove 11$^a$ centrally of the several burners 12 thereon. The simmering burner 10 includes a body 11 upon which is supported a cap 12$^c$ including a vertical side wall 12$^b$ and top 12$^a$ arranged in spaced relation to the side wall to provide an air space adapted to coöperate with the air ports 11$^b$ in the body 11 to permit a thorough circulation of air through the cap. The cap is formed with openings 13 corresponding in number to the number of burners 12 of the gas stove and arranged in line therewith. The body 11 is formed with an integral marginal boss 14, having an internal circular passage 14$^a$ therein communicating with a plurality of outlet ports 14$^b$. The circular passage 14$^a$ communicates with a vertical air passage 15, whereby air is admitted to the passage 14$^a$ and the lower portion of the air passage 15 communicates with a substantially L-shaped passage 17 formed in the body and communicating with a gas supply pipe or tube 18, which latter is secured in the body 11 and is connected at the opposite end with the valve casing 19 by a coupling 20. The passage of gas from the passage 17 to the air passage 15 is controlled by an adjustable needle valve 16. The end of the valve casing 19 opposite the gas tube or pipe 18 is provided with a reduced extension 21, which is connected with the gas supply pipe 22 of the gas stove and is formed in the reduced end thereof with an inlet port 23, which communicates with the valve chamber 24, receiving the rotary valve 25.

The exposed end of the valve 25 is connected with a handle 26 and the lower end thereof receives a screw 27, whereby the valve is retained in position in the casing 19. The valve 25 is formed in line with the inlet port 23 with a T-shaped port 29 adapted, when the valve is properly adjusted, to connect the inlet port 23 with the lower outlet port 30 in the valve casing 19 and thus permit the gas to pass through the valve casing and valve to the pipe 18.

A branch or auxiliary upper outlet port 31 is formed in the wall of the inlet port 23, and communicates with the valve chamber 24 and registers, at its inner end, with a circumferential groove 32 formed in the valve 25. A port 33 is formed in the end of the valve casing 19 opposite the inlet port 23 and in spaced relation to the port 30 and communicates with an inner pipe 34 arranged in concentrically spaced relation within the outer pipe 18, whereby gas is permitted to flow from the inlet port 23 through the auxiliary port 31, groove 32 and port 33 to the inner pipe 34.

The end of the inner pipe 34 opposite the valve casing 19 is secured in the burner body 11 and communicates with an angular port 36 formed in said body. The vertical portion of the angular port 36 in the burner body is connected at its upper terminal with a pilot burner tip 37, which is arranged under the cap 12ᶜ and is formed with a plurality of apertures 38 so arranged as to direct a flame through the several openings 13 and toward the burners 12 of the gas stove. It will be understood that the tip 37 is constantly supplied with gas passing from the main supply pipe 22, through the inlet port 23, auxiliary port 31, groove 32, port 33, inner pipe 34 and passage 36, and the passage of gas through the auxiliary port 31 is regulated by a screw valve 39.

The valve 25 is formed with a vertical opening 40, which communicates with the T-shaped port 29 and slidably receives the valve stem 41 carrying the valve 42, which latter is adapted to engage in the lower terminal of a port 43 formed in the valve 25 and close communication between said port 43 and the T-shaped port 29. The valve 42 is normally retained in closed position by the compression of a coil spring 44 engaged with the upper exposed end of the valve 25 and carrying a button 45 adapted to be depressed to open the valve 42 and thus permit an additional supply of gas to enter the inner pipe 34 through the angular port and passage 33, with which said angular port 43 communicates.

In use, when it is desired to utilize the invention as a simmering burner, the valve 25 is adjusted by the handle 26, so as to register the diametrical portion of the T port 29 with the inlet port 28 and the port 30, and thus the gas is permitted to flow through the space between the inner and outer pipes 34 and 18, respectively, and is conducted to the apertures 14ᵇ in the body 11 by the angular passages 17, 15 and 14ᵃ. It will be understood that gas is constantly supplied to the pilot burner tip 37 and flows from the inlet port 23 through the auxiliary port 31, circumferential groove 32, port 33, inner pipe 34 and passage 36, the passage of the gas through the auxiliary port 31 being regulated by the screw valve 39. When it is desired to light any one or all of the several burners 12 of the gas stove, the button 45 is depressed against the compression of the spring 44, thereby moving the valve 42 off of its seat and permitting a relatively great volume of gas to flow through the port 43, port 33, inner pipe 34 and angular passage 36 to the burner tip 37. The increase in the gas pressure effected by the opening of the valve 42 causes the flame to be directed outwardly from the tip 37 through the openings 13 in the cap 12ᶜ and in the zone of the burners 12 of the gas stove, which are thus lighted.

What I claim is:

1. The combination with a gas stove having a series of burners, of a simmering burner having upwardly discharging outlet ports therein, and a lighter having gas outlet ports each disposed so as to project a flame across the outlet ports of one of the series of burners and the upwardly discharging ports of the simmering burner to simultaneously light both burners with the single flame.

2. The combination with a gas stove including a series of burners, of a simmering burner having a plurality of outlet ports therein and arranged in substantially the same horizontal plane with the series of burners, a lighter arranged centrally of the simmering burner and adapted to discharge horizontal flames across and above the simmering burner and series of burners, and a valve controlling the gas supply to the simmering burner and to the lighter.

3. In combination, a simmering burner including a body having an annular series of discharge ports therein, and a burner tip arranged within the series of ports and having a plurality of openings therein for directing flames across and above the gas discharge ports in the body.

4. In a lighting device for gas stoves, a simmering burner, a lighter supported on the simmering burner, a gas conducting pipe for supplying gas to the simmering burner, and a pipe arranged within the first-mentioned pipe for conducting gas to the lighter, a valve including a casing having a vertical valve chamber therein, an inlet port communicating with said valve chamber and spaced outlet ports connecting said valve chamber with the two gas conducting pipes, a valve rotatably mounted in said valve chamber having a T-shaped port adapted to connect said inlet port with one of the outlet ports and having a circumferential groove registering with the other outlet port, said body having an auxiliary port connecting the inlet port with said groove, and means for admitting an additional supply of gas to the last-mentioned outlet port.

5. In combination, a burner including a body having vertical air passages therethrough and a series of gas outlet ports arranged outwardly of the air passages, means for conducting gas to said outlet ports, said body having a gas passage therein, a lighter tip communicating with said passage, and a cap positioned upon said body and communicating with said air passages.

6. In combination, a simmering burner including a body having a plurality of outlet ports and an angular passage therein, means for supplying gas to the outlet ports, a lighter including a burner tip supported upon said body and communicating with the angular passage therein, means for supplying gas to said lighter, and a cap removably supported upon the body inclosing the burner tip and having openings therein permitting the flames from the burner tip to project exteriorly of the cap.

7. In combination, a simmering burner having a plurality of gas outlet ports therein, a lighter tip arranged centrally of the burner, and a cap supported upon the simmering burner, arranged inwardly of the gas ports therein and inclosing and protecting the lighter tip.

In testimony whereof I affix my signature in presence of two witnesses.

SIDNEY H. ALEXANDER.

Witnesses:
R. PICINICH, Jr.,
JOS. H. TILLOTSON.